No. 754,993. PATENTED MAR. 22, 1904.
O. C. GRAMLING.
BEAN HULLER.
APPLICATION FILED SEPT. 14, 1903.
NO MODEL.

Witnesses
Charles Morgan
Fred C Jones

Inventor
O. C. GRAMLING.
Attorneys

THE NORRIS PETERS CO., PHOTO-LITHO., WASHINGTON, D. C.

No. 754,993.　　　　　　　　　　　　　　　　　　　　　　　Patented March 22, 1904.

UNITED STATES PATENT OFFICE.

OSCAR C. GRAMLING, OF HANSON, FLORIDA.

BEAN-HULLER.

SPECIFICATION forming part of Letters Patent No. 754,993, dated March 22, 1904.

Application filed September 14, 1903. Serial No. 173,142. (No model.)

*To all whom it may concern:*

Be it known that I, OSCAR C. GRAMLING, a citizen of the United States, residing at Hanson, in the county of Madison, State of Florida, have invented certain new and useful Improvements in Bean-Hullers; and I do hereby declare the following to be a full, clear, and exact description of the invention, such as will enable others skilled in the art to which it appertains to make and use the same.

This invention relates to bean-hullers; and it has for its object to provide an improved huller wherein the beans will be thoroughly hulled and separated and in which the parts will be so constructed and arranged as to give durability to the mechanism and permit of its manufacture at a low cost.

Figure 1:
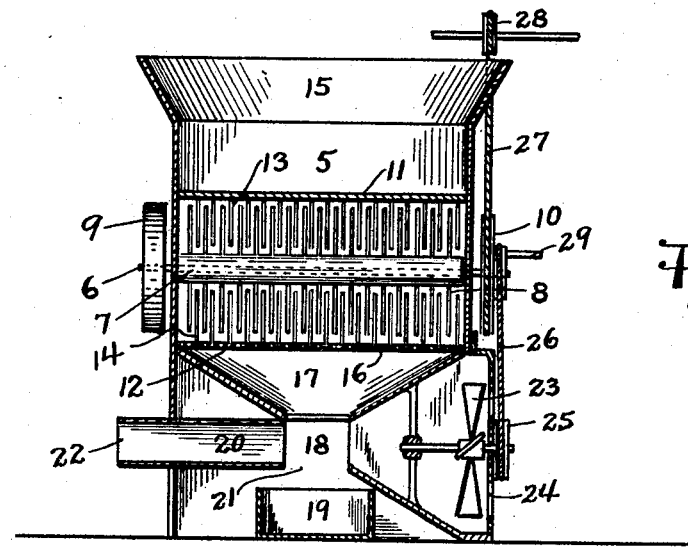
Figure 2:
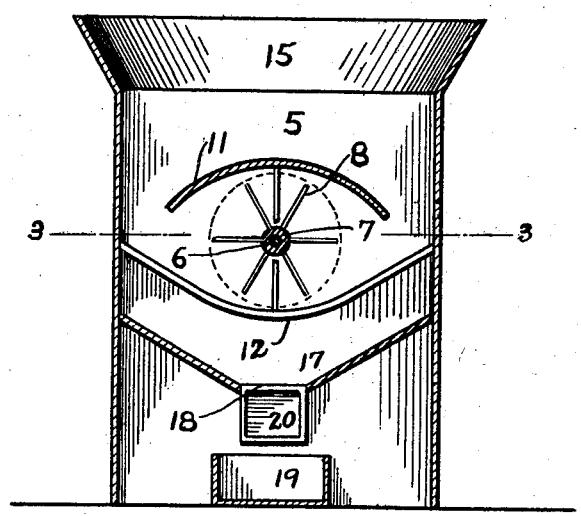
Figure 3:
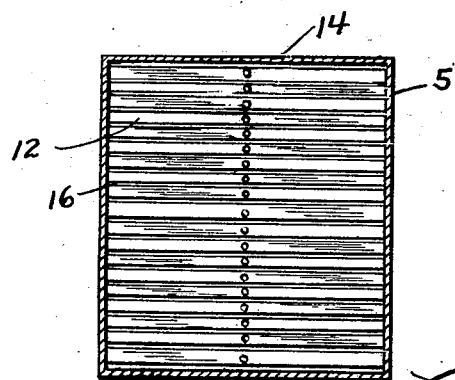

In the drawings forming a portion of this specification, and in which like numerals of reference indicate similar parts in the several views, Figure 1 is a vertical section through the hopper of the machine. Fig. 2 is a vertical section at right angles to Fig. 1. Fig. 3 is a section on line 3 3 of Fig. 2, with the wheel omitted.

Referring now to the drawings, the present machine consists of a casing, including a threshing-chamber 5, transversely of which is journaled the shaft 6 of the threshing-cylinder 7 having spikes 8 radiating therefrom, the ends of the shaft 6 projecting from the sides of the casing, one end of the shaft being provided with a fly-wheel 9, while the opposite end is provided with cone-pulleys 10. Above and below the cylinder are arranged the concaves 11 and 12, respectively, from which project spikes 13 and 14, respectively, which intermesh with the spikes 8 or alternate therewith, so that as the cylinder is rotated its spikes are carried between the spikes of the concaves to engage the bean-pods and thresh out the beans. Above the threshing-chamber is the hopper 15, into which the beans are fed and from which they pass at the sides of the concave 11 into engagement with the spikes of the threshing-cylinder for treatment, as above described.

In the ordinary threshing operation some unthreshed pods are apt to drop through, and to prevent this spaced salts 16 are arranged at both sides of the lower concave 12, the spacing of these slats being such that the pods cannot pass therebetween until after they have been thoroughly broken up, and these slats support the pods in the paths of movement of the teeth of the cylinder, so that they will be engaged thereby and moved against the teeth 14 of the concave and threshed. This retreatment of the pods will continue until the pods have been broken up sufficiently to insure the passage of the beans therefrom and to permit the pieces of the pods and the vines to pass between the slats and into the chute 17. The beans are discharged from the spout 18 of the chute to a receptacle 19, and in their passage through this spout they are subjected to an air-blast in the air-pipe 20. The beans with the finely-divided pieces of pod and vines are, in fact, precipitated into the air-pipe 20 through an opening in the top thereof, the beans falling through the pipe and out through the opening 21 in the bottom thereof, while the pieces of pods and other light particles are blown through the discharge end 22 of the air-pipe.

The air-pipe 20 is fed from a fan 23 in the fan-casing 24, the fan-shaft having a pulley-wheel 25, which is driven by a belt 26 from the cone-pulley 10, said pulley being connected by a belt 27 with the drive-pulley 28 of a suitably-disposed drive-shaft. To permit of operation of the machine by hand, the cone-pulley is provided with a crank 29.

In practice modifications of the specific construction shown may be made and any suitable materials and proportions may be used for the various parts without departing from the spirit of the invention.

What is claimed is—

1. A machine of the class described, comprising a casing, a threshing-cylinder in the casing, means disposed respectively above and below the cylinder and coöperating therewith to thresh material supplied thereto and spaced from the sides of the casing to permit of passage of said materials at the sides thereof, and spaced slats disposed in position to support said materials in position for treatment by the cylinder and said coöperating means.

2. A machine of the class described comprising a threshing-chamber, a hopper disposed to discharge to the threshing-chamber, a threshing-cylinder in the chamber, means disposed respectively above and below the cylinder and spaced from the sides of the chamber for coöperation with the cylinder to thresh materials supplied thereto, slats disposed to support said materials in position for treatment by the cylinder and said coöperating means, a chute below the slats disposed to receive therefrom, a receptacle and an air-blast apparatus disposed to discharge transversely below the chute and over the receptacle.

3. A machine of the class described comprising a cylinder having spikes, a concave above the cylinder, having spikes disposed for coöperation with those of the cylinder, and a concave disposed below the cylinder, said concave comprising spaced slats disposed transverse of the cylinder and having spikes coöperating with those of the cylinder.

In testimony whereof I affix my signature in presence of two witnesses.

OSCAR C. GRAMLING.

Witnesses:
   E. O. GRAMLING,
   T. Z. MARTIN.